United States Patent
Inaoka et al.

(10) Patent No.: US 9,056,959 B2
(45) Date of Patent: Jun. 16, 2015

(54) METHOD FOR PRODUCING CHLORINATED VINYL CHLORIDE RESIN

(71) Applicant: KANEKA CORPORATION, Osaka-shi, Osaka (JP)

(72) Inventors: Tetsuo Inaoka, Settsu (JP); Daichi Ohara, Takasago (JP); Toshiaki Ohashi, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 14/356,307

(22) PCT Filed: Nov. 1, 2012

(86) PCT No.: PCT/JP2012/078368
§ 371 (c)(1),
(2) Date: May 5, 2014

(87) PCT Pub. No.: WO2013/069542
PCT Pub. Date: May 16, 2013

(65) Prior Publication Data
US 2014/0309325 A1    Oct. 16, 2014

(30) Foreign Application Priority Data

Nov. 7, 2011 (JP) ................. 2011-243780
Feb. 6, 2012 (JP) ................. 2012-022695

(51) Int. Cl.
C08J 3/28    (2006.01)
C08F 8/22    (2006.01)
C08F 14/06   (2006.01)

(52) U.S. Cl.
CPC ..... *C08J 3/28* (2013.01); *C08F 8/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,532,773 A | * | 10/1970 | Bier et al. | 522/4 |
| 3,621,078 A | * | 11/1971 | Kitamura et al. | 522/132 |
| 3,725,359 A | * | 4/1973 | Goswami et al. | 525/326.6 |
| 3,862,264 A | * | 1/1975 | Nojima et al. | 524/399 |
| 4,006,126 A | * | 2/1977 | Rettore et al. | 522/132 |
| 4,049,517 A | | 9/1977 | Adachi et al. | |
| 4,350,798 A | * | 9/1982 | Parker | 522/132 |
| 4,412,898 A | * | 11/1983 | Olson et al. | 522/132 |
| 4,459,387 A | * | 7/1984 | Parker | 522/132 |
| 6,197,895 B1 | | 3/2001 | Suzuki et al. | |

(Continued)

FOREIGN PATENT DOCUMENTS

| CN | 1486334 | 3/2004 |
|---|---|---|
| CN | 101759823 | 6/2010 |

(Continued)

*Primary Examiner* — Sanza McClendon
(74) *Attorney, Agent, or Firm* — Hamre, Schumann, Mueller & Larson, P.C.

(57) ABSTRACT

A method for producing a chlorinated vinyl chloride resin of the present invention includes chlorinating a vinyl chloride resin by irradiating the inside of a reactor, into which the vinyl chloride resin and chlorine have been introduced, with ultraviolet light, thereby producing a chlorinated vinyl chloride resin. The irradiation of ultraviolet light is carried out through use of at least one kind of light source selected from the group consisting of an ultraviolet LED, an organic EL, an inorganic EL, and an ultraviolet laser. A chlorinated vinyl chloride resin that shows suppressed initial coloring during hot forming and/or improved thermal stability can be provided by the method for producing a chlorinated vinyl chloride resin of the present invention.

4 Claims, 6 Drawing Sheets

(56) References Cited

U.S. PATENT DOCUMENTS

| | | |
|---|---|---|
| 6,242,539 B1 | 6/2001 | Tadokoro et al. |
| 2001/0014721 A1 | 8/2001 | Tadokoro et al. |
| 2004/0048945 A1 | 3/2004 | Ueshima et al. |
| 2009/0312544 A1 | 12/2009 | Van Deynse et al. |
| 2010/0122224 A1* | 5/2010 | Lucas et al. .................. 716/4 |
| 2010/0181186 A1 | 7/2010 | Uenveren et al. |
| 2010/0324299 A1* | 12/2010 | Yoshikawa et al. ........... 546/345 |

FOREIGN PATENT DOCUMENTS

| | | |
|---|---|---|
| EP | 1 361 231 | 11/2003 |
| GB | 1314434 A * | 4/1973 |
| JP | 63-145305 | 6/1988 |
| JP | 10-279627 | 10/1998 |
| JP | 11-043509 | 2/1999 |
| JP | 2002-060420 | 2/2002 |
| JP | 2004-099669 | 4/2004 |
| JP | 2009-538878 | 11/2009 |
| JP | 2010-235487 | 10/2010 |
| JP | 2010-533678 | 10/2010 |
| JP | 2011-063551 | 3/2011 |
| WO | 2007/138075 | 12/2007 |
| WO | 2009/013198 | 1/2009 |
| WO | WO 2010127841 A2 * | 11/2010 |

* cited by examiner

METHOD FOR PRODUCING CHLORINATED VINYL CHLORIDE RESIN

TECHNICAL FIELD

The present invention relates to a method for producing a chlorinated vinyl chloride resin. Specifically, the present invention relates to a method for producing a chlorinated vinyl chloride resin using photochlorination.

BACKGROUND ART

The heat-resistant temperature of a chlorinated vinyl chloride resin becomes higher than that of a vinyl chloride resin due to chlorination. Therefore, the chlorinated vinyl chloride resin has been used in various fields such as a heat-resistant pipe, a heat-resistant industrial plate, a heat-resistant film, and a heat-resistant sheet.

The chlorinated vinyl chloride resin generally is produced by chlorinating a vinyl chloride resin while supplying chlorine to an aqueous suspension obtained by suspending vinyl chloride resin particles in an aqueous medium. Usually, when chlorination is performed by photochlorination, the irradiation of ultraviolet light is carried out through use of a mercury lamp so as to generate a chlorine radical (Patent document 1).

PRIOR ART DOCUMENT

Patent Document

Patent document 1: JP 10(1998)-279627 A

DISCLOSURE OF INVENTION

Problem to be Solved by the Invention

The chlorinated vinyl chloride resin has excellent features such as the high mechanical strength, weather resistance, and chemical resistance of a vinyl chloride resin, and further is more excellent in heat resistance than the vinyl chloride resin. However, a chlorinated vinyl chloride resin obtained by photochlorination has the following problem: the thermal stability of the chlorinated vinyl chloride resin is lower than that of the vinyl chloride resin, and hence the chlorinated vinyl chloride resin is likely to be burnt during hot forming, which makes it difficult to subject the chlorinated vinyl chloride resin to hot forming for a long period of time. Therefore, the chlorinated vinyl chloride resin obtained by photochlorination is insufficient in an initial coloring property during hot forming and/or thermal stability in some cases.

The present invention provides a method for producing a chlorinated vinyl chloride resin capable of obtaining a chlorinated vinyl chloride resin that achieves at least one of the suppression of initial coloring during hot forming and the improvement of thermal stability.

Means for Solving Problem

A method for producing a chlorinated vinyl chloride resin of the present invention includes chlorinating a vinyl chloride resin by irradiating an inside of a reactor, into which the vinyl chloride resin and chlorine have been introduced, with ultraviolet light, thereby producing a chlorinated vinyl chloride resin, wherein the irradiation of ultraviolet light is carried out through use of at least one kind of light source selected from the group consisting of an ultraviolet LED, an organic EL, an inorganic EL, and an ultraviolet laser.

In the method for producing a chlorinated vinyl chloride resin of the present invention, it is preferred that the ultraviolet light emitted from the light source have a peak wavelength in a range of 290 nm or more and 400 nm or less. Further, it is preferred that the ultraviolet light emitted from the light source have a peak wavelength in a range of 350 nm or more and 400 nm or less. Further, it is preferred that the light source be an ultraviolet LED. Further, it is preferred that the vinyl chloride resin be supplied with chlorine by supplying chlorine to an aqueous suspension of the vinyl chloride resin.

Effects of the Invention

The method for producing a chlorinated vinyl chloride resin of the present invention can provide a chlorinated vinyl chloride resin that shows suppressed initial coloring during hot forming and/or improved thermal stability by chlorinating a vinyl chloride resin by irradiation of ultraviolet light through use of at least one kind of light source selected from the group consisting of an ultraviolet LED, an organic EL, an inorganic EL, and an ultraviolet laser.

DESCRIPTION OF THE INVENTION

Figure 1:
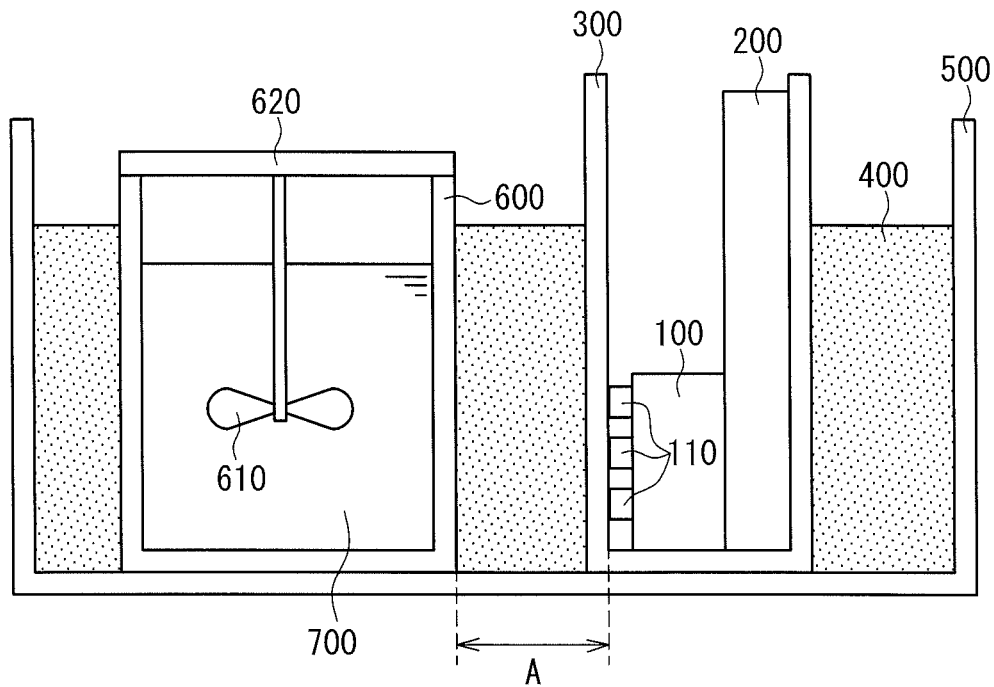
FIG. 1 is a schematic side sectional view of a device for producing a chlorinated vinyl chloride resin including an ultraviolet LED light source device and a reactor used in Example 1 of the present invention.

In the present invention, a chlorinated vinyl chloride resin is obtained by chlorinating a vinyl chloride resin by irradiating a reactor, into which the vinyl chloride resin and chlorine have been introduced, with ultraviolet light through use of at least one kind of light source selected from the group consisting of an ultraviolet LED, an organic EL, an inorganic EL, and an ultraviolet laser, preferably the ultraviolet LED. The inventors of the present invention found that a chlorinated vinyl chloride resin obtained by chlorinating a vinyl chloride resin by irradiating the vinyl chloride resin and chlorine with ultraviolet light through use of at least one kind of light source selected from the group consisting of an ultraviolet LED, an organic EL, an inorganic EL, and an ultraviolet laser, preferably the ultraviolet LED, shows suppressed initial coloring during hot forming and/or improved thermal stability, thereby achieving the present invention. Further, under the condition of the same stirring property in the reactor and the same irradiation range of the vinyl chloride resin from the light source, the total power consumption in the step of chlorinating the vinyl chloride resin is decreased by carrying out irradiation of ultraviolet light through use of at least one kind of light source selected from the group consisting of an ultraviolet LED, an organic EL, an inorganic EL, and an ultraviolet laser, and consequently production cost is reduced. Alternatively, at least one kind of light source selected from the group consisting of an ultraviolet LED, an organic EL, an inorganic EL, and an ultraviolet laser, particularly the ultraviolet LED, has reduced degradation of luminous intensity caused by long-term use, compared with a mercury lamp, and hence the frequency of replacing the light source is decreased, resulting in enhancement of productivity of a chlorinated vinyl chloride resin. Alternatively, under the same total power consumption, at least one kind of light source selected from the group consisting of an ultraviolet LED, an organic EL, an inorganic EL, and an ultraviolet laser has shorter reaction time, compared with that of a mercury lamp. In the present invention, the total power consumption is calculated by the following numerical expression (1):

$$\text{Total power consumption } (W \cdot h) = I \times V \times t \times (\text{number of light sources}) \quad (1)$$

where I(A) represents a current value of a light source; V(V) represents a voltage value of the light source; and t(h) represents chlorination reaction time.

In the present invention, preferably, a chlorinated vinyl chloride resin is obtained by supplying chlorine to an aqueous suspension of a vinyl chloride resin and chlorinating the vinyl chloride resin in the aqueous suspension by irradiating the aqueous suspension with ultraviolet light through use of at least one kind of light source selected from the group consisting of an ultraviolet LED, an organic EL, an inorganic EL, and an ultraviolet laser. The aqueous suspension of the vinyl chloride resin can be obtained by suspending a vinyl chloride resin in an aqueous medium. For example, an aqueous suspension of a vinyl chloride resin can be obtained by using water as an aqueous medium and mixing a vinyl chloride resin with the water.

In the present invention, a chlorinated vinyl chloride resin may also be obtained by chlorination in a vapor phase (vapor phase chlorination), instead of chlorination using an aqueous suspension of a vinyl chloride resin as described above. The vapor phase chlorination refers to chlorinating a vinyl chloride resin by irradiating the vinyl chloride resin and chlorine with ultraviolet light through use of at least one kind of light source selected from the group consisting of an ultraviolet LED, an organic EL, an inorganic EL, and an ultraviolet laser while directly blowing the chlorine into powder of the vinyl chloride resin.

It is appropriate that the ultraviolet LED is an LED capable of emitting ultraviolet light, and the ultraviolet LED is not particularly limited. For example, as the ultraviolet LED, a semiconductor light-emitting element using a nitride semiconductor material such as AlN, AlGaN, or AlInGaN for a light-emitting layer or a semiconductor light-emitting element using a diamond thin film as a light-emitting layer is used. Preferably, an ultraviolet LED having one peak wavelength is used. Further, the peak wavelength of ultraviolet light emitted from an ultraviolet LED can be adjusted by the proportion of each composition in a light-emitting layer. For example, in the case where a nitride semiconductor material is used for a light-emitting layer of an ultraviolet LED, the peak wavelength of ultraviolet light becomes short as the content of Al increases. For irradiation of ultraviolet light, a light source such as an organic EL, an inorganic EL, or an ultraviolet laser capable of emitting ultraviolet light can be used besides an ultraviolet LED. Of those, the ultraviolet LED is preferably used as a light source. It is preferred that a light source such as an organic EL, an inorganic EL, or an ultraviolet laser emit ultraviolet light having the same peak wavelength and/or wavelength range as that of ultraviolet light emitted from the ultraviolet LED. The peak wavelength and wavelength range of ultraviolet light emitted from the ultraviolet LED are as described later.

The peak wavelength of ultraviolet light emitted from the ultraviolet LED is preferably 290 nm or more and 400 nm or less, more preferably 315 nm or more and 400 nm or less, still more preferably 315 nm or more and 385 nm or less, particularly preferably 320 nm or more and 365 nm or less from the viewpoint of suppression of initial coloring during hot forming and improvement of thermal stability. Further, the peak wavelength of ultraviolet light emitted from the ultraviolet LED is preferably 340 nm or more and 400 nm or less, more preferably 355 nm or more and 395 nm or less, still more preferably 365 nm or more and 385 nm or less from the viewpoint of durability of a reactor. It should be noted that ultraviolet light having a peak wavelength of 315 nm or more and 400 nm or less is also referred to as "UVA". For example, an ultraviolet LED emitting ultraviolet light having a peak wavelength of 365 nm or an ultraviolet LED emitting ultraviolet light having a peak wavelength of 385 nm can be used.

The wavelength range of ultraviolet light emitted from the ultraviolet LED is preferably 260 nm or more and 430 nm or less, more preferably 300 nm or more and 420 nm or less, still more preferably 305 nm or more and 400 nm or less. In the present invention, the term "wavelength range of ultraviolet light" as used herein refers to a range of a wavelength having a relative emission intensity of 2% or more with respect to relative emission intensity of a peak wavelength in an emission spectrum. For example, in an emission spectrum of ultraviolet light shown in FIG. 2, the wavelength range is 350 nm to 392 nm, and in an emission spectrum of ultraviolet light shown in FIG. 8, the wavelength range is 355 nm to 415 nm.

Figure 7:
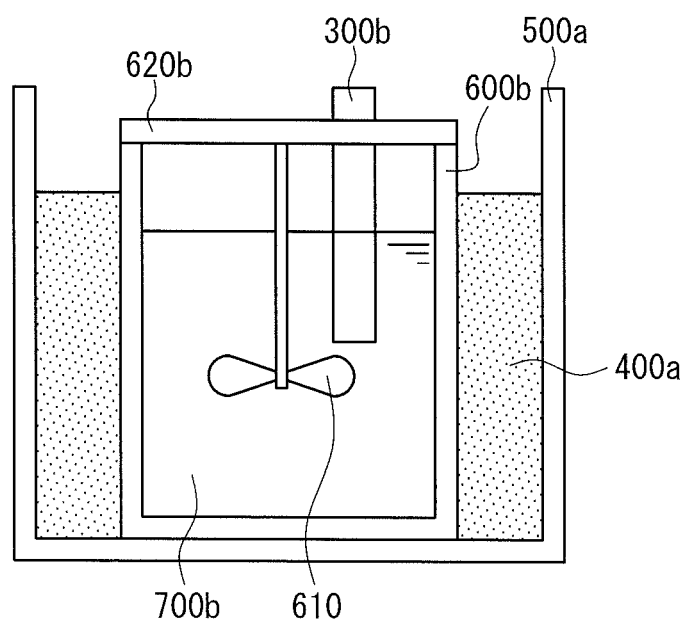
FIG. 7 is a schematic side sectional view of a device for producing a chlorinated vinyl chloride resin including the ultraviolet LED light source device and a reactor used in Example 3 of the present invention.

Further, it is preferred to use an ultraviolet LED emitting ultraviolet light having a wavelength range of 300 nm or more and 430 nm or less and a peak wavelength of 350 nm or more and 400 nm or less from the viewpoint of thermal stability. It is more preferred to use an ultraviolet LED emitting ultraviolet light having a wavelength range of 325 nm or more and 430 nm or less and a peak wavelength of 355 nm or more and 395 nm or less. It is still more preferred to use an ultraviolet LED emitting ultraviolet light having a wavelength range of 330 nm or more and 430 nm or less and a peak wavelength of 365 nm or more and 385 nm or less. Alternatively, an ultraviolet LED emitting ultraviolet light having a wavelength range of 350 nm or more and 392 nm or less and a peak wavelength of 365 nm is preferred from the viewpoint of high chlorination reaction efficiency. In the present invention, the chlorination reaction efficiency can be evaluated based on a required total light quantity and/or reaction time, in the case of producing a chlorinated vinyl chloride resin containing the same amount of chlorine through use of a vinyl chloride resin having the same component. As the required total light quantity is smaller, the chlorination reaction efficiency becomes higher. Further, as the reaction time is shorter, the chlorination reaction efficiency becomes higher. In the present invention, the "total light quantity" is measured and calculated as follows. A sensor ("UD-36" (product No.) produced by Topcon Co., Ltd.) is mounted on a UV radiometer ("UVR-2" (product No.) produced by Topcon Co., Ltd.), and a light quantity per unit area of ultraviolet light emitted from a light source is measured at a position where the distance between the vinyl chloride resin present in a reactor and the light source is shortest during a chlorination reaction. Further, an irradiation area in which the vinyl chloride resin is irradiated with ultraviolet light emitted from the light source is measured at the position where the distance between the vinyl chloride resin present in the reactor and the light source is shortest during a chlorination reaction. A value obtained by multiplying the value of the irradiation area obtained in the above-mentioned measurement by the value of the light quantity per unit area obtained in the above-mentioned measurement is defined as a total light quantity. For example, in the case where a production device shown in FIG. 1 is used for producing a chlorinated vinyl chloride resin, a light quantity per unit area and an irradiation area are measured at a position of an inner wall of a reactor 600. In the case where a production device shown in FIG. 7 is used for producing a chlorinated vinyl chloride resin, a light quantity per unit area and an irradiation area are measured at a position of an outer wall of a cylindrical container 300b in which an ultraviolet LED light source device has been inserted. It should be noted that, in the foregoing, a light quantity per unit area and an irradiation area are measured in an air atmosphere under the condition that the reactor is empty.

One ultraviolet LED or multiple ultraviolet LEDs may be used for chlorinating a vinyl chloride resin. In the case where multiple ultraviolet LEDs are used, ultraviolet LEDs having the same peak wavelength of ultraviolet light to be emitted may be combined to be used, or ultraviolet LEDs having different peak wavelengths of ultraviolet light to be emitted may be combined to be used. The term "ultraviolet LED" as used herein refers to both an ultraviolet LED element and an ultraviolet LED light source device including multiple ultraviolet LED elements.

As a vinyl chloride resin to be used as a raw material for a chlorinated vinyl chloride resin, a homopolymer of a vinyl chloride monomer or a copolymer of a vinyl chloride monomer and another copolymerizable monomer can be used. There is no particular limit to the other copolymerizable monomer, and for example, there may be given ethylene, propylene, vinyl acetate, allyl chloride, allyl glycidyl ether, an acrylic acid ester, and vinyl ether.

A dispersant, an oil-soluble polymerization initiator, and the like are used for homopolymerization of a vinyl chloride monomer or copolymerization of a vinyl chloride monomer and another polymerizable monomer. It should be noted that a polymerization regulator, a chain transfer agent, a pH regulator, an antistatic agent, a cross-linking agent, a stabilizer, a filler, an antioxidant, scale inhibitor, and the like further may be used for the above-mentioned polymerizations.

As the dispersant, for example, partially saponified polyvinyl acetate, methyl cellulose, hydroxypropyl methyl cellulose, or the like is used. As the oil-soluble polymerization initiator, for example, lauroyl peroxide, di-2-ethylhexylperoxy neodecanoate, t-butylperoxy neodecanoate, $\alpha,\alpha'$-azobis-2,4-dimethylvaleronitrile or the like is used.

The average particle diameter of a vinyl chloride resin is preferably 0.1 to 350 µm, more preferably 80 to 200 µm, although it is not particularly limited. In the present invention, the average particle diameter of the vinyl chloride resin is measured in accordance with JIS K0069.

An aqueous suspension of a vinyl chloride resin is obtained, for example, by mixing a vinyl chloride resin and water and suspending the vinyl chloride resin in water, although the method for obtaining the aqueous suspension is not limited thereto. The obtained aqueous suspension of the vinyl chloride resin is put in a reactor and stirred with a stirring blade disposed in the reactor. The aqueous suspension of the vinyl chloride resin that is being stirred is irradiated with ultraviolet light by an ultraviolet LED disposed at least in the reactor or outside the reactor while being supplied with chlorine. The chlorination reaction of the vinyl chloride resin is started by the start of the irradiation of ultraviolet light from the ultraviolet LED.

The vinyl chloride resin in the aqueous suspension is chlorinated until a desired content of chlorine is achieved. The chlorination reaction is stopped by the completion of the irradiation of ultraviolet light. After the chlorination reaction is stopped, unreacted chlorine in the resultant chlorinated vinyl chloride resin is expelled by nitrogen or the like, and remaining hydrochloric acid in the chlorinated vinyl chloride resin is removed through use of hot water at a temperature of equal to or less than Tg (glass transition temperature) of the chlorinated vinyl chloride resin. After that, dehydration and drying steps are conducted, with the result that a chlorinated vinyl chloride resin is obtained.

From the viewpoint of productivity, viscosity stability of the aqueous suspension, and the uniform mixing property during stirring, the concentration of the vinyl chloride resin in the aqueous suspension is preferably 10% by weight or more and 40% by weight or less, more preferably 20% by weight or more and 35% by weight or less.

When chlorine is supplied to the reactor, chlorine may be either in a gaseous form or in a liquid form. However, it is preferred that chlorine be in a gaseous form from the viewpoint of ease of handling. The method for supplying chlorine is not particularly limited as long as it is capable of supplying chlorine to the aqueous suspension. For example, as the method for supplying chlorine, there may be given a method for supplying chlorine at a time in an initial stage before the start of the chlorination reaction, a method for supplying chlorine intermittently during the chlorination reaction, and a method for supplying chlorine continuously during the chlorination reaction. As described above, the chlorination reaction is started by the start of the irradiation of ultraviolet light and is ended by the completion of the irradiation of ultraviolet light.

The maximum reaction temperature during the chlorination reaction is not particularly limited and is preferably 90° C. or less, more preferably 88° C. or less, still more preferably 86° C. or less. When the maximum reaction temperature is 90° C. or less, the degradation of a vinyl chloride resin is suppressed, and the coloring of a chlorinated vinyl chloride resin to be obtained is suppressed. It is preferred that the minimum reaction temperature during the chlorination reaction be more than 0° C. from the viewpoint of facilitating flow of the aqueous suspension with a stirring blade. Further, the minimum reaction temperature is preferably 30° C. or more, more preferably 50° C. or more from the viewpoint of shortening the reaction time.

The chlorination reaction is a heat-generation reaction, and hence it is preferred that the reactor be equipped with a cooling jacket, for example, so as to control the internal temperature of the reactor. The cooling jacket takes a balance between a heat removal amount and a heat generation amount, whereby the internal temperature of the reactor is controlled. The stirring blade disposed in the reactor may be an axial flow type such as a propeller blade or a radial flow type such as a paddle blade and a turbine blade.

As described above, a chlorinated vinyl chloride resin obtained by chlorinating a vinyl chloride resin by irradiating a reactor, into which the vinyl chloride resin and chlorine have been introduced, with ultraviolet light through use of at least one kind of light source selected from the group consisting of an ultraviolet LED, an organic EL, an inorganic EL, and an ultraviolet laser achieves at least one of the suppression of initial coloring during hot forming and the improvement of thermal stability. Preferably, the chlorinated vinyl chloride resin shows suppressed initial coloring during hot forming and is also improved in thermal stability.

In the present invention, the initial coloring during hot forming of the chlorinated vinyl chloride resin is evaluated by measuring a yellow index in accordance with JIS K7373 through use of a sample produced by subjecting the chlorinated vinyl chloride resin to hot forming. A lower value of a yellow index means that the initial coloring during hot forming is suppressed, that is, the initial coloring during hot forming is satisfactory. Further, the thermal stability of the chlorinated vinyl chloride resin is evaluated by heating a sample (sheet) produced through use of a chlorinated vinyl chloride resin in an oven at 200° C., and measuring time taken for the sheet to be blackened, that is, time taken for an L value (luminosity) to reach 20 or less. The time for the sample to be blackened being longer means higher thermal stability. Further, the heat resistance of the chlorinated vinyl chloride resin is evaluated by measuring a Vicat softening point by a B50 method in accordance with JIS K7206. A higher value of a Vicat softening point means higher heat resistance. It should be noted that the details of evaluation of initial coloring during hot forming, thermal stability, and heat resistance of the chlorinated vinyl chloride resin are as described later.

EXAMPLES

Hereinafter, the present invention is further specifically described by way of examples and comparative examples. However, the present invention is not limited thereto. In the following examples and comparative examples, "parts" and "%" are based on weight unless otherwise specified.

Example 1

Production of Chlorinated Vinyl Chloride Resin

As shown in FIG. 1, a UV-LED light source unit ("OX223" (model No.) produced by Sentec Corporation) was prepared as an ultraviolet LED light source device 100. The ultraviolet LED light source device 100 includes 3 ultraviolet LED elements 110 ("NC4U133" (product No.), forward current: 500 mA, forward voltage: 14.9 V, produced by Nichia Corporation) each having a peak wavelength of 365 nm.

Figure 2:
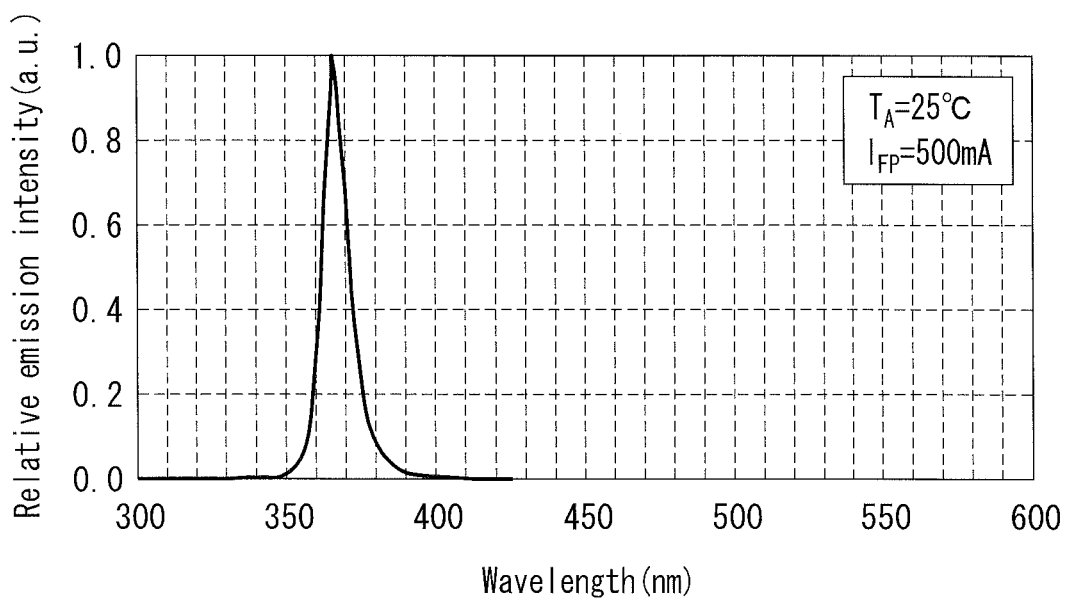
FIG. 2 is a graph showing an emission spectrum of an exemplary ultraviolet LED used in the present invention.

An emission spectrum of the ultraviolet LED element used in Example 1 was as shown in FIG. 2. As shown in FIG. 2, ultraviolet light emitted from the ultraviolet LED element 110 had a wavelength range of 350 nm to 392 nm and one peak having a peak wavelength of 365 nm. Herein, the wavelength range refers to a range of a wavelength having relative emission intensity of 2% or more with respect to the relative emission intensity of a peak wavelength in an emission spectrum as described above.

The ultraviolet LED light source device 100 was placed on a support 200 made of aluminum having a size: 20 mm in length, 20 mm in width, and 30 mm in height, and thereafter was inserted into a cylindrical container 300 {PYREX (registered trademark)} made of transparent glass having an inner diameter of 75 mm, a height of 400 mm, and a thickness of 2.5 mm.

The ultraviolet LED light source device 100 placed in the cylindrical container 300 and a reactor 600 {capacity: 3 L, PYREX (registered trademark)} that was a container made of transparent glass having a thickness of 3.6 mm were placed in a water bath 500 containing hot water 400 at 60° C. Specifically, the ultraviolet LED light source device 100 placed in the water bath 500 was placed in such a manner that the ultraviolet LED light source device 100 was opposed to the reactor 600 and three ultraviolet LED elements 110 were arranged in a row in a height direction at an equal interval of 15 mm. In this case, a distance A between the reactor 600 and the ultraviolet LED elements 110 was set to 80 mm. It should be noted that the water bath 500 is provided with a heat source (not shown) for keeping the hot water 400 at a predetermined temperature.

Next, 1.8 kg of pure water and 0.2 kg of a vinyl chloride resin (produced by Kaneka Corporation) having a K value of 66.7, an average particle diameter of 170 μm, and an apparent density of 0.568 g/ml were supplied to the reactor 600, and the reactor 600 was sealed with a cover 620. It should be noted that the K-value of the vinyl chloride resin was a value obtained in accordance with JIS K7367-2; the average particle diameter was a value obtained in accordance with JIS K0069; and the apparent density was a value obtained in accordance with JIS K7365. The same applies to the following. Then, a vinyl chloride resin aqueous suspension 700, which was a mixed solution of pure water and the vinyl chloride resin, was stirred at a rotation number of 340 rpm through use of a turbine blade 610 of the reactor 600.

The inside of the reactor 600 was subjected to vacuum deaeration and nitrogen replacement. Then, chlorine gas was blown into the vinyl chloride resin aqueous suspension 700. Simultaneously, the vinyl chloride resin aqueous suspension 700 was irradiated with ultraviolet light from the ultraviolet LED elements 110 while being stirred with the turbine blade 610, whereby a chlorination reaction was started. It should be noted that, when chlorine gas was blown, care was taken so that the reactor 600 was not reduced in pressure. During the chlorination reaction, the hot water 400 in the water bath 500 was kept at 60° C.

When the content of chlorine of the chlorinated vinyl chloride resin reached 66.3%, the chlorination reaction was stopped by completing the irradiation of ultraviolet light by the ultraviolet LED elements 110. The content of chlorine of the chlorinated vinyl chloride resin was calculated from a neutralization titration value of hydrochloric acid generated as a byproduct during the chlorination reaction. The same applied to the following. The reaction time of the chlorination reaction taken by the time when the content of chlorine of the chlorinated vinyl chloride resin reached 66.3%, that is, the time from the start of irradiation of ultraviolet light to the end thereof, was 96 minutes. Then, unreacted chlorine in the chlorinated vinyl chloride resin was expelled by nitrogen, and thereafter, any remaining hydrochloric acid was removed by washing with water. Then, the chlorinated vinyl chloride resin was dried. Thus, a chlorinated vinyl chloride resin was obtained.

Comparative Example 1

A chlorinated vinyl chloride resin was obtained in the same way as in Example 1 except for using one high-pressure mercury lamp (current value: 1.3 A, voltage value: 100 V, produced by Toshiba Lighting & Technology Corporation) of 100 W in place of the ultraviolet LED light source device 100 supported by the support 200.

In Comparative Example 1, the reaction time of the chlorination reaction taken by the time when the content of chlorine of the chlorinated vinyl chloride resin reached 66.3%, that is, the time from the start of the irradiation of ultraviolet light to the end thereof was 120 minutes.

The initial coloring during hot forming and the thermal stability of the chlorinated vinyl chloride resins obtained in Example 1 and Comparative Example 1 were measured and evaluated as follows. Further, as described below, the heat resistance was measured and evaluated by measuring and evaluating a Vicat softening point.

<Initial Coloring During Hot Forming>

Ten parts by weight of a methyl methacrylate-butadiene-styrene (MBS) resin ("Kane Ace (registered trademark) B31" produced by Kaneka Corporation), 1 part by weight of a liquid tin-based stabilizer ("TVS#8831" (product No.) produced by Nitto Kasei Co., Ltd.), 1 part by weight of a powdery tin-based stabilizer ("TVS#8813" (product No.) produced by Nitto Kasei Co., Ltd.), 1 part by weight of stearic acid serving as a lubricant ("Lunac (registered trademark) S-90V" produced by Kao Corporation), and 0.3 parts by weight of polyethylene wax ("Hiwax220MP" (product No.) produced by Mitsui Chemicals, Inc.) were blended with 100 parts by weight of a chlorinated vinyl chloride resin. The obtained mixture was kneaded with an 8-inch roll at 195° C. for 5 minutes to produce a sheet having a thickness of 0.6 mm.

A laminate of 15 sheets thus obtained was interposed between ferrotype plates obtained by plating a steel plate with chromium, followed by mirror finishing, and the laminate was pressed for 10 minutes under the condition of 200° C. with a pressure being adjusted in a range of 3 MPa to 5 MPa, whereby a plate having a thickness of 5 mm was produced. The yellow index (hereinafter, also referred to as "YI") of the obtained plate was measured with a colorimeter ("ZE-2000" (product No.) produced by Nippon Denshoku Industries Co., Ltd.) in accordance with JIS-K7373.

<Thermal Stability>

Ten parts by weight of a methyl methacrylate-butadiene-styrene (MBS) resin ("Kane Ace (registered trademark) B31" produced by Kaneka Corporation), 1 part by weight of a liquid tin-based stabilizer ("TVS#8831" (product No.) produced by Nitto Kasei Co., Ltd.), 1 part by weight of a powdery tin-based stabilizer ("TVS#8813" (product No.) produced by Nitto Kasei Co., Ltd.), 1 part by weight of stearic acid serving as a lubricant ("Lunac (registered trademark) S-90V" (product No.) produced by Kao Corporation), and 0.3 parts by weight of polyethylene wax ("Hiwax220MP" (product No.) produced by Mitsui Chemicals, Inc.) were blended with 100 parts by weight of a chlorinated vinyl chloride resin. The obtained mixture was kneaded with an 8-inch roll at 195° C. for 5 minutes to produce a sheet having a thickness of 0.6 mm. The obtained sheet was cut to a size: 3 cm in length and 5 cm in width. The cut sheet was heated in an oven at 200° C., and the time taken for the sheet to be blackened was measured. That the sheet is blackened means that the L value of a sheet is 20 or less. The L value was measured through use of a colorimeter ("ZE-2000" (product No.) produced by Nippon Denshoku Industries Co., Ltd.)

<Vicat Softening Point>

Ten parts by weight of a methyl methacrylate-butadiene-styrene (MBS) resin ("Kane Ace (registered trademark) B31" produced by Kaneka Corporation), 1 part by weight of a liquid tin-based stabilizer ("TVS#8831" (product No.) produced by Nitto Kasei Co., Ltd.), 1 part by weight of a powdery tin-based stabilizer ("TVS#8813" (product No.) produced by Nitto Kasei Co., Ltd.), 1 part by weight of stearic acid serving as a lubricant ("Lunac (registered trademark) S-90V" (product No.) produced by Kao Corporation), and 0.3 parts by weight of polyethylene wax ("Hiwax220MP" (product No.) produced by Mitsui Chemicals, Inc.) were blended with 100 parts by weight of a chlorinated vinyl chloride resin. The obtained mixture was kneaded with an 8-inch roll at 195° C. for 5 minutes to produce a sheet having a thickness of 0.6 mm. A laminate of 15 sheets thus obtained was interposed between ferrotype plates obtained by plating a steel plate with chromium, followed by mirror finishing, and the laminate was pressed for 10 minutes under the condition of 200° C. with a pressure being adjusted in a range of 3 MPa to 5 MPa, whereby a plate having a thickness of 5 mm was produced. The Vicat softening point of the chlorinated vinyl chloride resin was measured through use of the obtained plate in accordance with JIS-K7206. It should be noted that the load was set to 5 kg, and the temperature increase speed was set to 50° C./h (B50 method).

As a result of the above-mentioned measurements, the YI of the chlorinated vinyl chloride resin obtained in Example 1 was 136, the time taken for blackening thereof was 40 minutes, and the Vicat softening point thereof was 112.3° C. The YI of the chlorinated vinyl chloride resin obtained in Comparative Example 1 was 142, the time taken for blackening thereof was 30 minutes, and the Vicat softening point thereof was 111.6° C. Table 1 shows the results.

TABLE 1

| | | Example 1 | Comparative Example 1 |
|---|---|---|---|
| Experiment condition | Light source | Ultraviolet LED | Mercury lamp |
| | Peak wavelength (nm) | 365 | — |
| | Number of LED elements (pieces) | 3 | — |
| | Chlorination reaction time (min.) | 96 | 120 |
| | Total power consumption (W · h) | 35.8 | 260 |
| Chlorinated vinyl chloride resin | Content of chlorine (%) | 66.3 | 66.3 |
| | Initial coloring during hot forming (YI) | 136 | 142 |
| | Thermal stability (min.) | 40 | 30 |
| | Vicat softening point (° C.) | 112.3 | 111.6 |

As is understood from the data in Table 1, the chlorinated vinyl chloride resin obtained in Example 1 exhibited satisfactory initial coloring during hot forming due to its low YI and also exhibited satisfactory thermal stability because the time taken for blackening was long, compared with the chlorinated vinyl chloride resin obtained in Comparative Example 1. Further, the chlorinated vinyl chloride resin obtained in Example 1 also exhibited satisfactory heat resistance due to its high Vicat softening point, compared with the chlorinated vinyl chloride resin obtained in Comparative Example 1. In the case of producing a chlorinated vinyl chloride resin containing chlorine in the same content, the total power consumption required for the chlorination reaction was remarkably small in Example 1 in which the irradiation of ultraviolet light was performed through use of an ultraviolet LED, compared with Comparative Example 1 in which the irradiation of ultraviolet light was performed through use of a mercury lamp. Thus, Example 1 had an energy-saving effect and was reduced in cost.

Example 2

Production of Chlorinated Vinyl Chloride Resin

Figure 3:
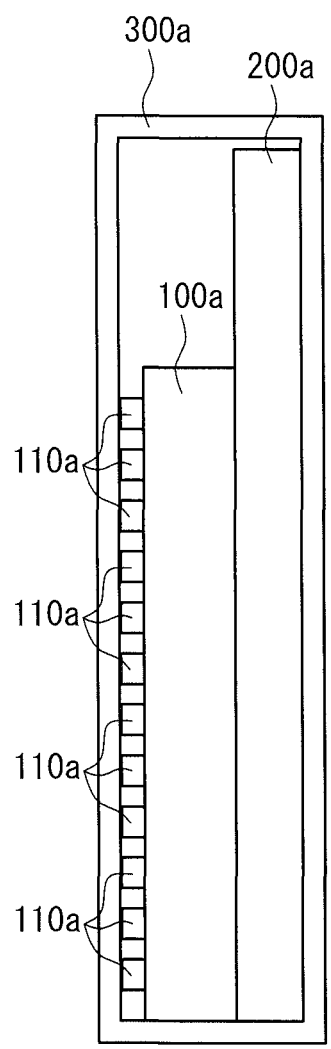
FIG. 3 is a schematic side sectional view of an ultraviolet LED light source device used in Example 2 of the present invention.

As shown in FIG. 3, a UV-LED light source unit ("OX224" (product No.) produced by Sentec Corporation) was prepared as an ultraviolet LED light source device 100a. The ultraviolet LED light source device 100a includes 12 ultraviolet LED elements 110a ("NC4U133" (product No.), forward current: 500 mA, forward voltage: 14.9 V, produced by Nichia Corporation) each emitting ultraviolet light having a peak wavelength of 365 nm. It should be noted that an emission spectrum of the ultraviolet LED element used in Example 2 was as shown in FIG. 2.

As shown in FIG. 3, the ultraviolet LED light source device 100a was placed so as to be supported by a support 200a, and thereafter was inserted into a cylindrical container 300a {PYREX (registered trademark)} made of transparent glass having an inner diameter of 74 mm, a height of 600 mm, and a thickness of 7 mm.

Figure 4:
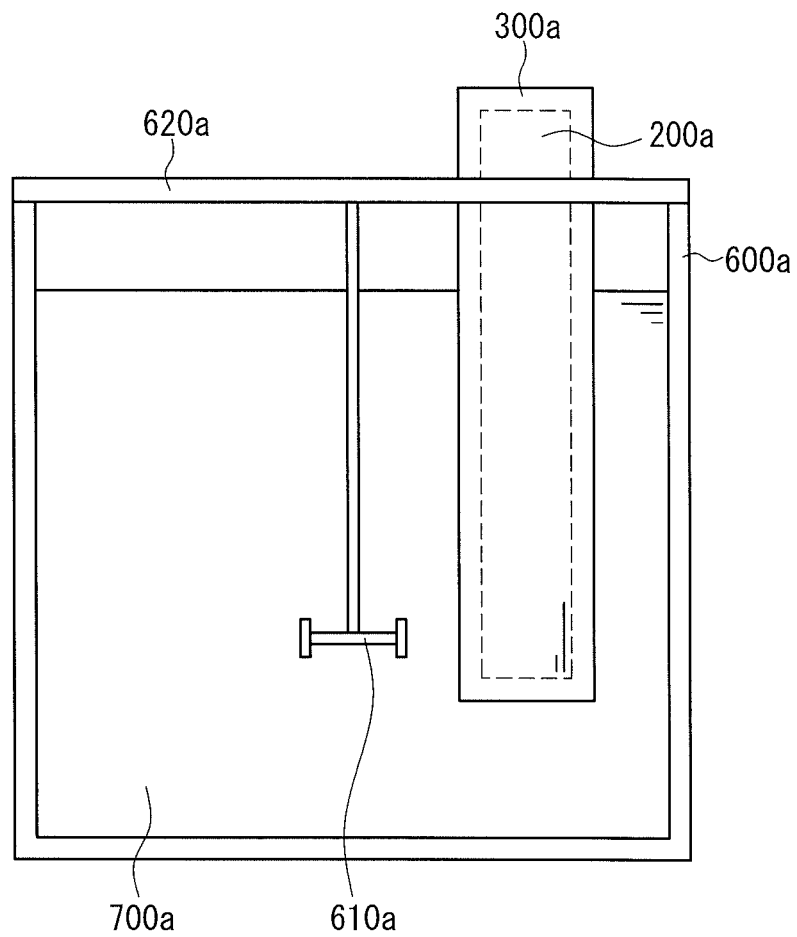
FIG. 4 is a schematic side sectional view of a device for producing a chlorinated vinyl chloride resin including the ultraviolet LED light source device and a reactor used in Example 2 of the present invention.
Figure 5:
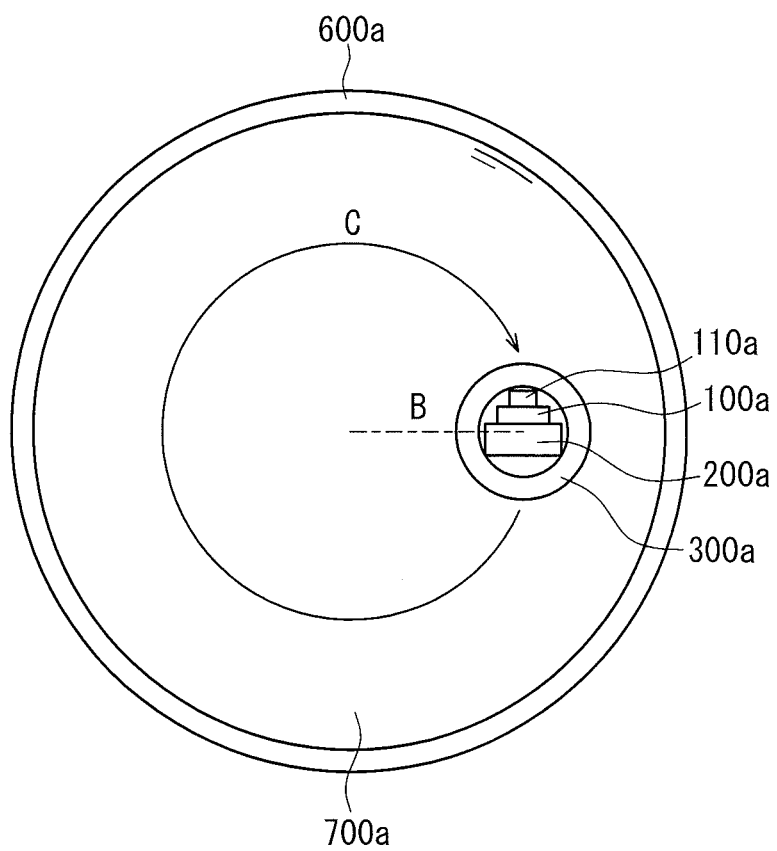
FIG. 5 is a schematic top view of the device for producing a chlorinated vinyl chloride resin including the ultraviolet LED light source device and the reactor used in Example 2 of the present invention.

As shown in FIGS. 4 and 5, one ultraviolet LED light source device 100a placed in the cylindrical container 300a was placed in a reactor 600a (capacity: 100 L) with a jacket. Specifically, the ultraviolet LED light source device 100a was placed in such a manner that a distance between a center of the cylindrical reactor 600a and a center of the cylindrical container 300a, that is, a length of B represented by alternate long and short dashed lines in FIG. 5 when seen from a top view was 210 mm. In this case, 12 ultraviolet LED elements 110a were arranged in a row in a height direction at an equal interval of 15 mm. Further, the ultraviolet LED element 110a disposed at the lowest position was at a position of 132 mm from a bottom surface of the reactor 600a. Then, the ultraviolet LED elements 110a were placed in such a direction that an ultraviolet light irradiation direction was opposed to a stirring flow direction (direction of an arrow C in FIG. 5).

Next, 45 kg of pure water and 5 kg of a vinyl chloride resin (produced by Kaneka Corporation) having a K value of 57.1, an average particle diameter of 125 μm, and an apparent density of 0.496 g/ml were supplied to the reactor 600a, and the reactor 600a was sealed with a cover 620a. Then, a vinyl chloride resin aqueous suspension 700a, which was a mixed solution of pure water and the vinyl chloride resin, was stirred at a rotation number of 590 rpm through use of a turbine blade 610a of the reactor 600a.

The inside of the reactor 600a was subjected to vacuum deaeration and nitrogen replacement, and thereafter, was subjected to vacuum deaeration again. Then, chlorine gas was blown into the vinyl chloride resin aqueous suspension 700a. Simultaneously, the vinyl chloride resin aqueous suspension 700a was irradiated with ultraviolet light from the ultraviolet LED elements 110a while being stirred with the turbine blade 610a, whereby a chlorination reaction was started. The temperature inside the reactor 600a was raised to 50° C. after 25 minutes have passed from the start of nitrogen replacement and cooled to 40° C. after 15 minutes have passed from the start of the chlorination reaction (start of the irradiation of ultraviolet light). During the subsequent chlorination reaction (irradiation of ultraviolet light), the temperature was kept at 40° C.

When the content of chlorine of the chlorinated vinyl chloride resin reached 64.4%, the chlorination reaction was stopped by completing the irradiation of ultraviolet light by the ultraviolet LED elements 110a. The reaction time of the chlorination reaction taken by the time when the content of chlorine of the chlorinated vinyl chloride resin reached 64.4%, that is, the time from the start of irradiation of ultraviolet light to the end thereof was 147 minutes. Then, unreacted chlorine in the chlorinated vinyl chloride resin was expelled by nitrogen, and thereafter, remaining hydrochloric acid was removed by washing with water. Then, the chlorinated vinyl chloride resin was dried. Thus, a chlorinated vinyl chloride resin was obtained.

Comparative Example 2

A chlorinated vinyl chloride resin was obtained in the same way as in Example 2 except for using one high-pressure mercury lamp ("SEH1002J01" (product No.), forward current: 1.1±0.1 A, forward voltage: 110±10 V, produced by Sun Energy Co., Ltd.) of 100 W in place of the ultraviolet LED light source device 100a supported by the support 200a.

In Comparative Example 2, the reaction time of the chlorination reaction taken by the time when the content of chlorine of the chlorinated vinyl chloride resin reached 64.4%, that is, the time from the start of the irradiation of ultraviolet light to the end thereof was 234 minutes.

The initial coloring during hot forming, thermal stability, and heat resistance (Vicat softening point) of the chlorinated vinyl chloride resins obtained in Example 2 and Comparative Example 2 were measured and evaluated as follows.

<Initial Coloring During Hot Forming>

Five parts by weight of a methyl methacrylate-butadiene-styrene (MBS) resin ("Kane Ace (registered trademark) B11A" produced by Kaneka Corporation), 3 parts by weight of a liquid tin-based stabilizer ("N2000C" (product No.) produced by Nitto Kasei Co., Ltd.), 1 part by weight of a PMMA resin ("Kane Ace (registered trademark) PA-20" produced by Kaneka Corporation), and 1 part by weight of a composite lubricant ("LVTN-4" (product No.) produced by Kawaken Fine Chemicals Co., Ltd.) were blended with 100 parts by weight of a chlorinated vinyl chloride resin. The obtained mixture was kneaded with an 8-inch roll at 180° C. for 3 minutes to produce a sheet having a thickness of 0.6 mm.

A laminate of 15 sheets thus obtained was interposed between ferrotype plates obtained by plating a steel plate with chromium, followed by mirror finishing, and the laminate was pressed for 10 minutes under the condition of 190° C. with a pressure being adjusted in a range of 3 MPa to 5 MPa, whereby a plate having a thickness of 5 mm was produced. The YI was measured with a colorimeter ("ZE-2000" (product No.) produced by Nippon Denshoku Industries Co., Ltd.) in accordance with JIS-K7373.

<Thermal Stability>

Five parts by weight of a methyl methacrylate-butadiene-styrene (MBS) resin ("Kane Ace (registered trademark) B11A" produced by Kaneka Corporation), 3 parts by weight of a liquid tin-based stabilizer ("N2000C" (product No.) produced by Nitto Kasei Co., Ltd.), 1 part by weight of a PMMA resin ("Kane Ace (registered trademark) PA-20" (product No.) produced by Kaneka Corporation), and 1 part by weight of a composite lubricant ("VLTN-4" (product No.) produced by Kawaken Fine Chemicals Co., Ltd.) were blended with 100 parts by weight of a chlorinated vinyl chloride resin. The obtained mixture was kneaded with an 8-inch roll at 180° C. for 3 minutes to produce a sheet having a thickness of 0.6 mm. The obtained sheet was cut to a size: 3 cm in length and 3.5 cm in width. The cut sheet was heated in an oven at 200° C., and the time taken for the sheet to be blackened was measured. That the sheet is blackened means that the L value of a sheet is 20 or less. The L value was measured through use of a colorimeter ("ZE-2000" (product No.) produced by Nippon Denshoku Industries Co., Ltd.)

<Vicat Softening Point>

Five parts by weight of a methyl methacrylate-butadiene-styrene (MBS) resin ("Kane Ace (registered trademark) B11A" produced by Kaneka Corporation), 3 parts by weight of a liquid tin-based stabilizer ("N2000C" (product No.) produced by Nitto Kasei Co., Ltd.), 1 part by weight of a PMMA resin ("Kane Ace (registered trademark) PA-20 (product No.) produced by Kaneka Corporation), 1 part by weight of a composite lubricant ("VLTN-4" (product No.) produced by Kawaken Fine Chemicals Co., Ltd.) were blended with 100 parts by weight of a chlorinated vinyl chloride resin. The obtained mixture was kneaded with an 8-inch roll at 180° C. for 3 minutes to produce a sheet having a thickness of 0.6 mm. A laminate of 15 sheets thus obtained was interposed between ferrotype plates obtained by plating a steel plate with chromium, followed by mirror finishing, and the laminate was pressed for 10 minutes under the condition of 200° C. with a pressure being adjusted in a range of 3 MPa to 5 MPa, whereby a plate having a thickness of 5 mm was produced. The Vicat softening point of the chlorinated vinyl chloride resin was measured through use of the obtained plate in accordance with JIS-K7206. It should be noted that the load was set to 5 kg, and the temperature rise speed was set to 50° C./h (B50 method).

As a result of the above-mentioned measurements, the YI of the chlorinated vinyl chloride resin obtained in Example 2 was 77.6, the time taken for blackening thereof was 80 minutes, and the Vicat softening point thereof was 98.6° C. The YI of the chlorinated vinyl chloride resin obtained in Comparative Example 2 was 87.1, the time taken for blackening thereof was 70 minutes, and the Vicat softening point thereof was 97.2° C. Table 2 shows the results.

TABLE 2

| | | Example 2 | Comparative Example 2 |
|---|---|---|---|
| Experiment condition | Light source | Ultraviolet LED | Mercury lamp |
| | Peak wavelength (nm) | 365 | — |
| | Number of LED elements (pieces) | 12 | — |
| | Chlorination reaction time (min.) | 147 | 234 |
| | Total power consumption (W · h) | 219 | 429 |
| Chlorinated vinyl chloride resin | Content of chlorine (%) | 64.4 | 64.4 |
| | Initial coloring during hot forming (YI) | 77.6 | 87.1 |
| | Thermal stability (min.) | 80 | 70 |
| | Vicat softening point (° C.) | 98.6 | 97.2 |

As is understood from the data in Table 2, the chlorinated vinyl chloride resin obtained in Example 2 exhibited satisfactory initial coloring during hot forming because the YI was low and also exhibited satisfactory thermal stability because the time taken for blackening was long, compared with the chlorinated vinyl chloride resin obtained in Comparative Example 2. Further, the chlorinated vinyl chloride resin obtained in Example 2 also exhibited satisfactory heat resistance because the Vicat softening point was high, compared with the chlorinated vinyl chloride resin obtained in Comparative Example 2. In the case of producing a chlorinated vinyl chloride resin containing chlorine in the same content, the total power consumption required for the chlorination reaction was remarkably smaller in Example 2 in which the irradiation of ultraviolet light was performed through use of an ultraviolet LED, compared with Comparative Example 2 in which the irradiation of ultraviolet light was performed through use of a mercury lamp. Thus, Example 2 had an energy-saving effect and was reduced in cost.

Example 3

Production of Chlorinated Vinyl Chloride Resin

Figure 6:
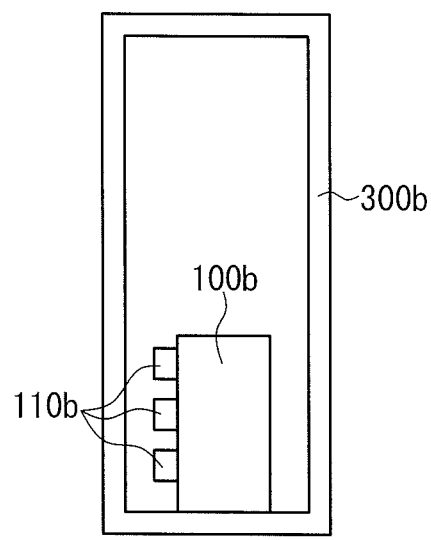
FIG. 6 is a schematic side sectional view of an ultraviolet LED light source device used in Example 3 of the present invention.

As shown in FIG. 6, a UV-LED light source unit ("OX558" (product No.) produced by Sentec Corporation) was prepared as an ultraviolet LED light source device 100b. The ultraviolet LED light source device 100b includes 3 ultraviolet LED elements 110b ("NC4U133A" (product No.), forward current: 500 mA, forward voltage: 14.9 V, produced by Nichia Corporation) each having a peak wavelength of 365 nm.

An emission spectrum of the ultraviolet LED element used in Example 3 was as shown in FIG. 2. As shown in FIG. 2, ultraviolet light emitted from the ultraviolet LED elements 110b had a wavelength range of 350 nm to 392 nm and one peak having a peak wavelength of 365 nm.

The ultraviolet LED light source device 100b was inserted into a cylindrical container 300b {PYREX (registered trademark)} made of transparent glass having an inner diameter of 25 mm, a height of 360 mm, and a thickness of 2.5 mm.

As shown in FIG. 7, a reactor 600b {capacity: 10 L, PYREX (registered trademark)} that was a container made of transparent glass was placed in a water bath 500a containing hot water 400a at 25° C., and one ultraviolet LED light source device 100b placed in the cylindrical container 300b was placed in the reactor 600b. In this case, three ultraviolet LED elements 110b were arranged in a row in a height direction at an equal interval of 15 mm. Further, the ultraviolet LED element 110b disposed at the lowest position was at a position of 90 mm from a bottom surface of the reactor 600b. Then, the ultraviolet LED elements 110b were placed in such a direction that an ultraviolet light irradiation direction was opposed to a stirring flow direction. It should be noted that the water bath 500a was provided with a heat source (not shown) for keeping the hot water 400a at predetermined temperature.

Next, 5.4 kg of pure water and 0.6 kg of a vinyl chloride resin (produced by Kaneka Corporation) having a K value of 66.7, an average particle diameter of 170 μm, and an apparent density of 0.568 g/ml were supplied to the reactor 600b, and the reactor 600b was sealed with a cover 620b. Then, a vinyl chloride resin aqueous suspension 700b that was a mixed solution of pure water and the vinyl chloride resin was stirred at a rotation number of 800 rpm through use or a turbine blade 610 of the reactor 600b.

The inside of the reactor 600b was subjected to vacuum deaeration and nitrogen replacement. Then, chlorine gas was blown into the vinyl chloride resin aqueous suspension 700b. Simultaneously, the vinyl chloride resin aqueous suspension 700b was irradiated with ultraviolet light from the ultraviolet LED elements 110b while being stirred with the turbine blade 610, whereby a chlorination reaction was started. It should be noted that, when chlorine gas was blown, care was taken so that the reactor 600b was not reduced in pressure. During the chlorination reaction, the hot water 400a in the water bath 500a was kept at 70° C.

When the content of chlorine of the chlorinated vinyl chloride resin reached 67.1%, the chlorination reaction was stopped by completing the irradiation of ultraviolet light by the ultraviolet LED elements 110b. The reaction time of the chlorination reaction taken by the time when the content of chlorine of the chlorinated vinyl chloride resin reached 67.1%, that is, the time from the start of irradiation of ultraviolet light to the end thereof was 120 minutes. Then, unreacted chlorine in the chlorinated vinyl chloride resin was expelled by nitrogen, and thereafter, remaining hydrochloric acid was removed by washing with water. Then, the chlorinated vinyl chloride resin was dried. Thus, a chlorinated vinyl chloride resin was obtained.

Example 4

A chlorinated vinyl chloride resin was obtained in the same way as in Example 3 except for using one UV-LED light source unit ("OX559" (product No.) produced by Sentec Corporation) as an ultraviolet LED light source device in place of the ultraviolet LED light source device 100b. The ultraviolet LED light source device has 3 ultraviolet LED elements ("NC4U134A" (product No.), forward current: 500 mA, forward voltage: 14.8 V, produced by Nichia Corporation) each having a peak wavelength of 385 nm.

Figure 8:
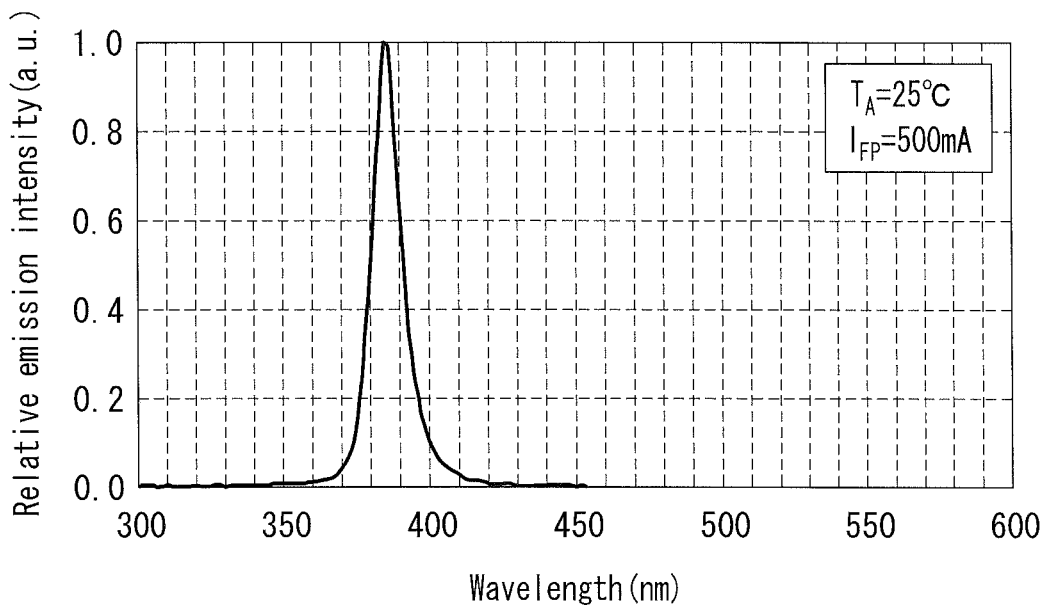
FIG. 8 is a graph showing an emission spectrum of an exemplary ultraviolet LED used in the present invention.

An emission spectrum of the ultraviolet LED used in Example 4 was as shown in FIG. 8. As shown in FIG. 8, ultraviolet light emitted from the ultraviolet LED elements had a wavelength range of 355 nm to 415 nm and one peak having a peak wavelength of 385 nm. Herein, the wavelength range refers to a range of a wavelength having relative emission intensity of 2% or more with respect to the relative emission intensity of a peak wavelength in an emission spectrum as described above.

In Example 4, the reaction time of the chlorination reaction taken by the time when the content of chlorine of the chlorinated vinyl chloride resin reached 67.2%, that is, the time from the start of irradiation of ultraviolet light to the end thereof was 135 minutes.

Comparative Example 3

A chlorinated vinyl chloride resin was obtained in the same way as in Example 3 except for using one high-pressure mercury lamp (forward current: 1.3 A, forward voltage: 100 V, produced by Toshiba Lighting & Technology Corporation) of 100 W in place of the ultraviolet LED light source device 100b.

In Comparative Example 3, the reaction time of the chlorination reaction taken by the time when the content of chlorine of the chlorinated vinyl chloride resin reached 67.1%, that is, the time from the start of the irradiation of ultraviolet light to the end thereof was 93 minutes.

The initial coloring during hot forming, thermal stability, and Vicat softening point of the chlorinated vinyl chloride resins obtained in Examples 3 and 4 and Comparative Example 3 were measured and evaluated in the same way as in Example 1.

As a result, the YI of the chlorinated vinyl chloride resin obtained in Example 3 was 91.1, the time taken for blackening thereof was 60 minutes, and the Vicat softening point thereof was 117.8° C. The YI of the chlorinated vinyl chloride resin obtained in Example 4 was 93.3, the time taken for blackening thereof was 50 minutes, and the Vicat softening point thereof was 115.2° C. The YI of the chlorinated vinyl chloride resin obtained in Comparative Example 3 was 132.3, the time taken for blackening thereof was 20 minutes, and the Vicat softening point thereof was 114.3° C. Table 3 shows those results together.

Further, each total light quantity in Examples 3 and 4 and Comparative Example 3 was measured and calculated as follows. A sensor ("UD-36" (product No.) produced by Topcon Co., Ltd.) was mounted on a UV radiometer ("UVR-2" (product No.) produced by Topcon Co., Ltd.), and a light quantity per unit area of ultraviolet light emitted from a light source was measured at a position where the distance between vinyl chloride resin present in a reactor and the light source was shortest during a chlorination reaction. Further, an irradiation area in which the vinyl chloride resin was irradiated with ultraviolet light emitted from the light source was measured at the position where the distance between the vinyl chloride resin present in the reactor and the light source was shortest during a chlorination reaction. A value obtained by multiplying the value of the irradiation area obtained in the above-mentioned measurement by the value of the light quantity per unit area obtained in the above-mentioned measurement was defined as a total light quantity. In the foregoing, a light quantity per unit area and an irradiation area were measured in an air atmosphere under the condition that the reactor was empty. Table 3 shows the results.

TABLE 3

| | | Example 3 | Example 4 | Comparative Example 3 |
|---|---|---|---|---|
| Experiment condition | Light source | Ultraviolet LED | | Mercury lamp |
| | Peak wavelength (nm) | 365 | 385 | — |
| | Number of LED elements (pieces) | 3 | 3 | — |
| | Chlorination reaction time (min.) | 120 | 135 | 93 |
| | Total light quantity (mW) | 2569 | 3049 | 2798 |
| | Total power consumption (W · h) | 44.7 | 50.0 | 201.5 |
| Chlorinated vinyl chloride resin | Content of chlorine (%) | 67.1 | 67.2 | 67.1 |
| | Initial coloring during hot forming (YI) | 91.1 | 93.3 | 132.3 |
| | Thermal stability (min.) | 60 | 50 | 20 |
| | Vicat softening point (° C.) | 117.8 | 115.2 | 114.3 |

As is understood from the data in Table 3, the chlorinated vinyl chloride resins obtained in Examples 3 and 4 exhibited satisfactory initial coloring during hot forming because the YI was low and also exhibited satisfactory thermal stability because the time taken for blackening was long, compared with the chlorinated vinyl chloride resin obtained in Comparative Example 3. Further, the chlorinated vinyl chloride resins obtained in Examples 3 and 4 also exhibited satisfactory heat resistance because the Vicat softening point was high, compared with the chlorinated vinyl chloride resin obtained in Comparative Example 3. In the case of producing a chlorinated vinyl chloride resin containing chlorine in the same content, the total power consumption required for the chlorination reaction was remarkably smaller in Examples 3 and 4 in which the irradiation of ultraviolet light was performed through use of an ultraviolet LED, compared with Comparative Example 3 in which the irradiation of ultraviolet light was performed through use of a mercury lamp. Thus, Examples 3 and 4 had an energy-saving effect and were reduced in cost.

As is understood from the data of Table 3, a chlorinated vinyl chloride resin that has been further improved in initial coloring during hot forming and thermal stability was obtained in Example 3 using an ultraviolet LED emitting ultraviolet light having a peak wavelength of 365 nm, compared with Example 4 using an ultraviolet LED emitting ultraviolet light having a peak wavelength of 385 nm. Further, it was found that, in the case of producing a chlorinated vinyl chloride resin containing chlorine in the same content, the required total light quantity is smaller, reaction time is shorter, and reaction efficiency is higher in Example 3 using an ultraviolet LED emitting ultraviolet light having a peak wavelength of 365 nm, compared with Example 4 using an ultraviolet LED emitting ultraviolet light having a peak wavelength of 385 nm.

Example 5

Production of Chlorinated Vinyl Chloride Resin

The ultraviolet LED light source device 100b was used in the same way as in Example 3.

Figure 9:
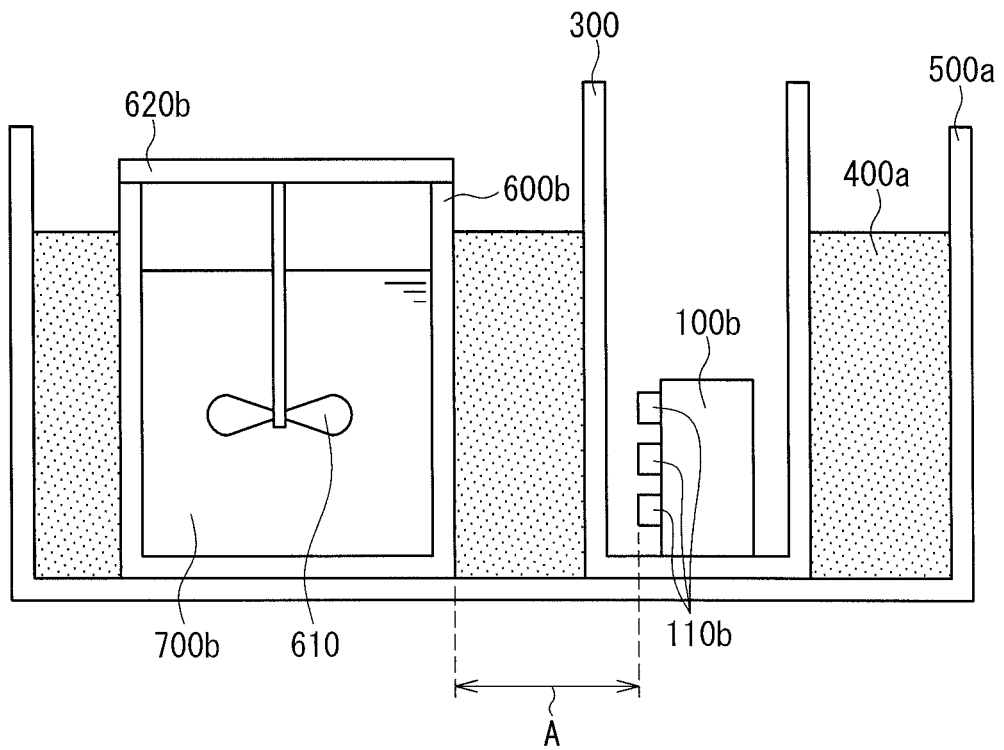
FIG. 9 is a schematic side sectional view of a device for producing a chlorinated vinyl chloride resin including an ultraviolet LED light source device and a reactor used in Example 5 of the present invention.

As shown in FIG. 9, the ultraviolet LED light source device 100b was inserted into a cylindrical container 300 {PYREX (registered trademark)} made of transparent glass having an inner diameter of 75 mm, a height of 400 mm, and a thickness of 2.5 mm. Although not shown, the periphery of the LED light source device 100b was surrounded by an aluminum foil so as to condense light. A front surface of the ultraviolet LED element 110b was cut to form an opening having a size of 50 mm in length and 50 mm in width so as to prevent light from leaking from portions other than the opening.

As shown in FIG. 9, the ultraviolet LED light source device 100b placed in the cylindrical container 300 and a reactor 600b {capacity: 10 L, PYREX (registered trademark)} that was a container made of transparent glass were placed in a water bath 500a containing hot water 400a at 25° C. Specifically, the ultraviolet LED light source device 100b placed in the water bath 500a was placed in such a manner that the ultraviolet LED light source device 100b was opposed to the reactor 600b and three ultraviolet LED elements 110b were arranged in a row in a height direction at an equal interval of 15 mm. In this case, a distance A between the reactor 600b and the ultraviolet LED element 110b was set to 60 mm. It should be noted that the water bath 500a was provided with a heat source (not shown) for keeping the hot water 400a at predetermined temperature.

Next, 5.4 kg of pure water and 0.6 kg of a vinyl chloride resin (produced by Kaneka Corporation) having a K value of 66.7, an average particle diameter of 170 μm, and an apparent density of 0.568 g/ml were supplied to the reactor 600b, and the reactor 600b was sealed with a cover 620b. Then, a vinyl chloride resin aqueous suspension 700b, which was a mixed solution of pure water and the vinyl chloride resin, was stirred at a rotation number of 800 rpm through use of a turbine blade 610 of the reactor 600b.

The inside of the reactor 600b was subjected to vacuum deaeration and nitrogen replacement. Then, chlorine gas was blown into the vinyl chloride resin aqueous suspension 700b. Simultaneously, the vinyl chloride resin aqueous suspension 700b was irradiated with ultraviolet light from the ultraviolet LED elements 110b while being stirred with the turbine blade 610, whereby a chlorination reaction was started. It should be noted that, when chlorine gas was blown, care was taken so that the reactor 600b was not reduced in pressure. During the chlorination reaction, the hot water 400a in the water bath 500a was kept at 70° C.

When the content of chlorine of the chlorinated vinyl chloride resin reached 67.2%, the chlorination reaction was stopped by completing the irradiation of ultraviolet light by the ultraviolet LED elements 110b. The reaction time of the chlorination reaction taken by the time when the content of chlorine of the chlorinated vinyl chloride resin reached 67.2%, that is, the time from the start of irradiation of ultraviolet light to the end thereof was 309 minutes. Then, unreacted chlorine in the chlorinated vinyl chloride resin was expelled by nitrogen, and thereafter, remaining hydrochloric acid was removed by washing with water. Then, the chlorinated vinyl chloride resin was dried. Thus, a chlorinated vinyl chloride resin was obtained.

Example 6

A chlorinated vinyl chloride resin was obtained in the same way as in Example 5 except for using one ultraviolet LED light source device similar to that of Example 4 as an ultraviolet LED light source device.

In Example 6, the reaction time of the chlorination reaction taken by the time when the content of chlorine of the chlorinated vinyl chloride resin reached 67.2%, that is, the time from the start of irradiation of ultraviolet light to the end thereof was 300 minutes.

The initial coloring during hot forming, thermal stability, and Vicat softening point of the chlorinated vinyl chloride resins obtained in Examples 5 and 6 were measured and evaluated in the same way as in Example 1.

As a result, the YI of the chlorinated vinyl chloride resin obtained in Example 5 was 91.9, the time taken for blackening thereof was 90 minutes, and the Vicat softening point thereof was 117.1° C. The YI of the chlorinated vinyl chloride resin obtained in Example 6 was 93.8, the time taken for blackening thereof was 90 minutes, and the Vicat softening point thereof was 117.1° C. Table 4 shows those results.

Further, each total light quantity in Examples 5 and 6 was measured and calculated in the same way as in Example 3. Table 4 shows the results together.

TABLE 4

| | | Example 5 | Example 6 |
|---|---|---|---|
| Experiment condition | Light source | Ultraviolet LED | |
| | Peak wavelength (nm) | 365 | 385 |
| | Number of LED elements (pieces) | 3 | 3 |
| | Chlorination reaction time (min.) | 309 | 300 |
| | Total light quantity (mW) | 200 | 390 |
| | Total power consumption (W · h) | 115 | 111 |
| Chlorinated vinyl chloride resin | Content of chlorine (%) | 67.2 | 67.2 |
| | Initial coloring during hot forming (YI) | 91.9 | 93.8 |
| | Thermal stability (min.) | 90 | 90 |
| | Vicat softening point (° C.) | 117.1 | 117.1 |

As is understood from the data of Table 4, a chlorinated vinyl chloride resin that has been further improved in initial coloring during hot forming was obtained in Example 5 using an ultraviolet LED emitting ultraviolet light having a peak wavelength of 365 nm, compared with Example 6 using an ultraviolet LED emitting ultraviolet light having a peak wavelength of 385 nm. Further, it was found that, in the case of producing a chlorinated vinyl chloride resin containing chlorine in the same content, the required total light quantity is almost a half and reaction efficiency is higher in Example 5 using an ultraviolet LED emitting ultraviolet light having a peak wavelength of 365 nm, although reaction time is almost the same, compared with Example 6 using an ultraviolet LED emitting ultraviolet light having a peak wavelength of 385 nm. There was no difference in total power consumption between Examples 5 and 6.

DESCRIPTION OF REFERENCE NUMERALS 100, 100a, 100b ultraviolet LED light source device
110, 110a, 110b ultraviolet LED element
200, 200a support
300, 300a, 300b cylindrical container
400, 400a hot water
500, 500a water bath
600, 600a, 600b reactor
610, 610a turbine blade
620, 620a, 620b cover
700, 700a, 700b vinyl chloride resin aqueous suspension

The invention claimed is:

1. A method for producing a chlorinated vinyl chloride resin, comprising:

chlorinating a vinyl chloride resin by irradiating an inside of a reactor, into which the vinyl chloride resin and chlorine have been introduced, with ultraviolet light, thereby producing the chlorinated vinyl chloride resin, wherein the irradiation of the ultraviolet light is carried out through use of at least one light source selected from the group consisting of an ultraviolet LED, an organic EL, and an inorganic EL, and the ultraviolet light emitted from the light source has a peak wavelength in a range from 350 nm to 400 nm.

2. The method for producing a chlorinated vinyl chloride resin according to claim 1, wherein the light source is the ultraviolet LED.

3. The method for producing a chlorinated vinyl chloride resin according to claim 1, wherein the chlorine is supplied to the vinyl chloride resin by supplying the chlorine to an aqueous suspension of the vinyl chloride resin.

4. The method for producing a chlorinated vinyl chloride resin according to claim 2, wherein the chlorine is supplied to the vinyl chloride resin by supplying the chlorine to an aqueous suspension of the vinyl chloride resin.

* * * * *